Jan. 31, 1967     T. F. THOMPSON     3,301,096

FLUID COUPLING

Filed April 17, 1964     3 Sheets-Sheet 1

INVENTOR
THEODORE F. THOMPSON

BY Rudolph L. Lowell

ATTORNEY

Jan. 31, 1967   T. F. THOMPSON   3,301,096
FLUID COUPLING
Filed April 17, 1964   3 Sheets-Sheet 2

INVENTOR
THEODORE F. THOMPSON
BY
*Rudolph L. Rowell*
ATTORNEY

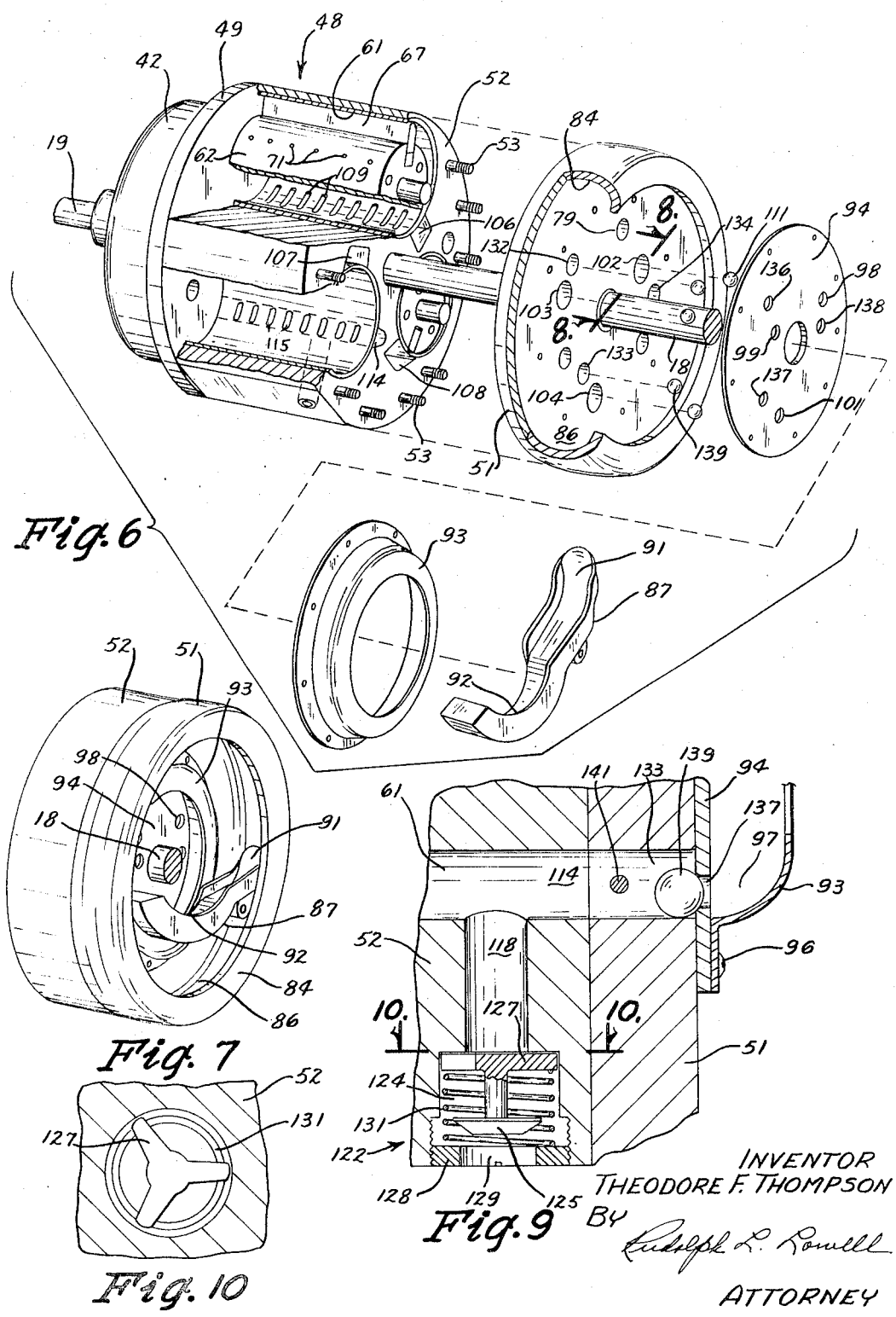

United States Patent Office 3,301,096
Patented Jan. 31, 1967

3,301,096
FLUID COUPLING
Theodore F. Thompson, 409 E. 12th St.,
Davenport, Iowa 52803
Filed Apr. 17, 1964, Ser. No. 360,708
2 Claims. (Cl. 74—774)

This invention relates to a fluid coupling for transmitting the power of a drive means to a driven means. More particularly the invention pertains to a hydraulic fluid controlled gear train for coupling a driven shaft with a drive shaft.

It is the object of the invention to provide an improved fluid coupling.

Another object of the invention is to provide a speed responsive fluid coupling which has a high torque output at low speeds and a low torque output at high speeds.

A further object of the invention is to provide a fluid coupling which is operable to reverse the direction of rotation of the output drive shaft of the coupling.

Still another object of the invention is to provide a fluid coupling having a variable power output in the direction of forward drive and a direct or constant power output in the direction of reverse drive.

An additional object of the invention is to provide a rugged fluid coupling which is smooth and efficient in operation, and economical to manufacture and maintain.

These and other objects and advantages of this invention will become readily apparent upon reference to the following description and the accompanying drawing, wherein:

FIG. 6 is an exploded perspective view partly in section of the rotatable control assembly for the power transmitting gear train of the fluid coupling of FIG. 1;

FIG. 7 is a fragmentary perspective view of the fluid input mechanism of the gear train control assembly;

FIG. 9 is an enlarged fragmentary sectional view of a portion of the control assembly showing the speed responsive valve in an open position; and FIG. 10 is a sectional view taken along the line 10—10 of FIG. 9.

Figure 1:
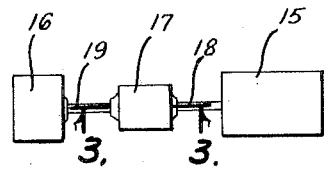
FIG. 1 is a diagrammatic view of a power transmission system having the fluid coupling of this invention.
Figure 2:
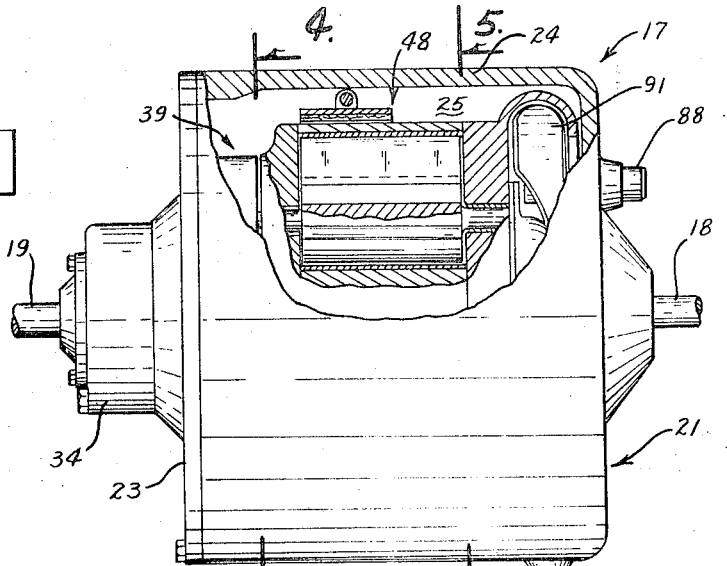
FIG. 2 is an enlarged elevational view partly in section of the fluid coupling of FIG. 1.

Referring to the drawing, there is shown in FIG. 1 a power transmission system comprising a prime mover or drive means 15, such as an internal combustion engine, drivably connected to a driven means 16, such as a differential drive transmission for a motor vehicle, by a fluid coupling 17 of this invention. The power is transmitted through an input drive shaft 18 from the drive means 15 to the fluid coupling 17. An output driven shaft 19 operatively joins the fluid coupling 17 with the driven means 16.

Figure 3:
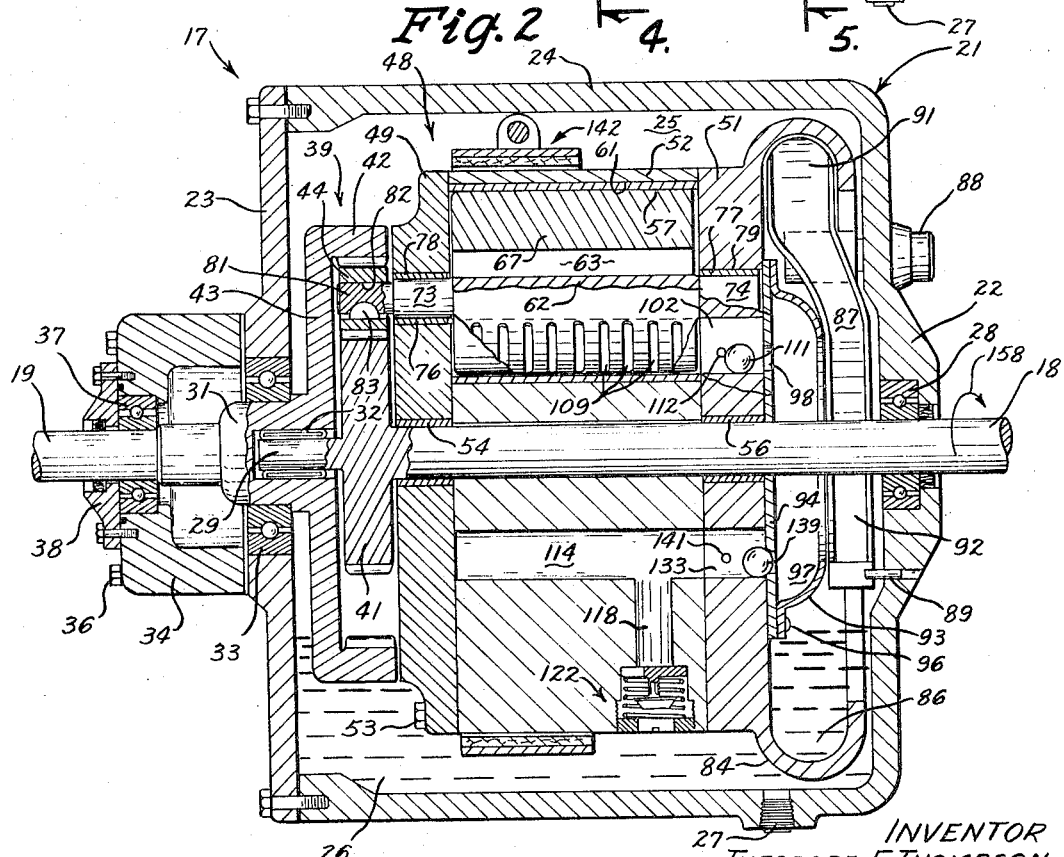
FIG. 3 is an enlarged sectional view taken along the line 3—3 of FIG. 1.

As shown in FIG. 3, the fluid coupling 17 has a housing indicated generally at 21 comprising upright end walls 22 and 23 joined with a peripheral wall 24 to form an enclosed chamber 25. Hydraulic fluid 26, such as oil, is stored in the lower portion of the chamber 25. A plug 27 is threaded into the bottom section of the peripheral wall 24 and is removable therefrom to open a drain hole for the purpose of removing the hydraulic fluid 26 from the chamber 25.

The input shaft 18 projects axially into the chamber 25. A bearing 28 rotatably supports the shaft 18 on the end wall 22. The end of the shaft 18 in the chamber 25 has a short spindle 29 positioned in a cup-shaped hub 31 and rotatably supported thereon by roller bearing 32. The hub 31 projects through a bearing 33 which rotatably mounts the hub on the housing end wall 23. The output shaft 19 is secured to the base of the hub 31 in axial alignment with the input shaft 18.

In order to stabilze the output shaft 19 and maintain the axial alignment thereof with the input shaft 18 a cup-shaped boss 34 is positioned about the shaft 19 and secured to the end wall 23 by bolts 36. A bearing 37 rotatably supports the shaft on the boss 34. An annular seal 38 is positioned about the shaft 19 and secured to the boss 34.

Figure 4:
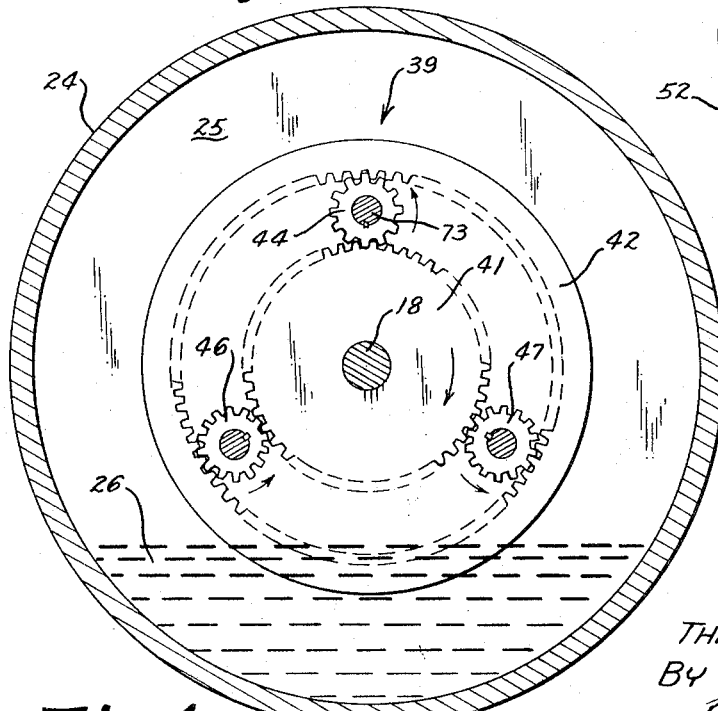
FIG. 4 is an enlarged sectional view taken along the line 4—4 of FIG. 2.

The input shaft 18 is drivably connected to the output shaft 19 by a planetary gear train indicated generally at 39. As shown in FIG. 3, the gear train 39 comprises a sun gear 41 secured to the input shaft 18 adjacent the spindle 29. Concentrically disposed about the sun gear 41 is an annular internal ring gear 42 secured to the hub 31 by a disc 43. Three equally spaced planetary gears 44, 46 and 47 are circumferentially spaced around the sun gear 41 and are in meshing engagement with the sun gear 41 and the internal ring gear 42 (FIG. 4).

In operation the input shaft 18 drives the sun gear 41 which in turn rotates the planetary gears 44, 46 and 47 and revolves these gears about the axis of the shaft 18 to transmit torque to the internal ring gear 42 thereby rotating the output shaft 19. The drive ratio between the input shaft 18 and the output shaft 19 is a function of the speed of rotation of the planetary gears 44, 46 and 47 about their respective axes.

The driving action of the planetary gears 44, 46 and 47 is regulated by a control assembly, indicated generally at 48, which is responsive to the speed of rotation of the input shaft 18.

The control assembly 48 comprises a pair of side plates 49 and 51 positioned in engagement with the opposite end walls of a cylindrical body 52. Bolts 53 secure the side plates 49 and 51 to the body 52. The input shaft 18 projects axially through the side plates 49 and 51 and the cylindrical body 52 and is rotatably mounted on the side plates by sleeve bearings 54 and 56.

Figure 5:
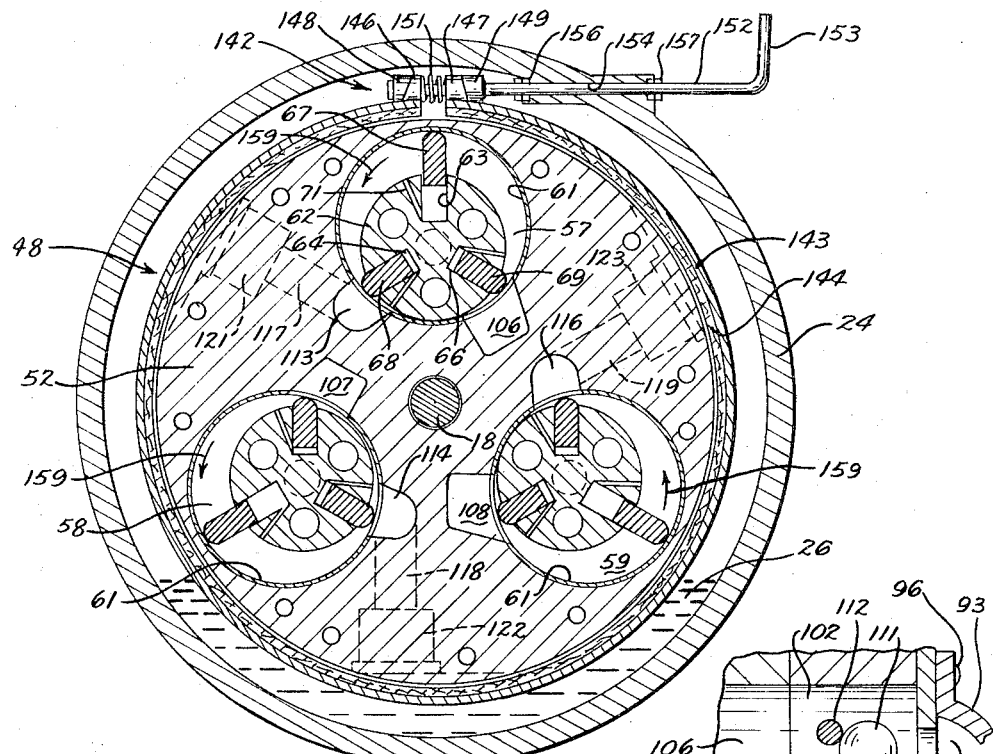
FIG. 5 is an enlarged sectional view taken along the line 5—5 of FIG. 2.

As shown in FIG. 5, the cylindrical body 52 has three axial bores 57, 58 and 59 each of which extends parallel to the input shaft 18. The bores 57, 58 and 59 are equally spaced from each other in a circumferential direction and are closed at their opposite ends by the side plates 49 and 51. A sleeve lining 61 of brass or similar bearing material is positioned in each of the bores in engagement with the walls thereof.

Positioned in each of the bores 57, 58 and 59 is a cylindrical rotor 62 having three axially extended radial grooves 63, 64 and 66. Flat blades or vanes 67, 68 and 69 are slidably disposed for movement in a radial direction in the grooves 63, 64 and 66, respectively. The base of each groove is connected in a fluid relation with the bore by a plurality of passages 71 in the cylindrical rotor 62. The passages 71 are circumferentially positioned forward of the vanes so that hydraulic fluid under pressure flows to the base of the grooves forcing the vanes in a radially outward direction.

Referring to FIG. 3, it is seen that the rotor 62 is eccentrically positioned in the bore 57 radially inward from the axis of the bore. Stub shafts 73 and 74 project from the opposite ends of the rotor 62. Sleeve bearings 76 and 77 are positioned about the stub shafts 73 and 74, respectively, and fit into holes 78 and 79 in the side plates 49 and 51 to rotatably support the rotor 62 on the side plates 49 and 51. The rotor 62 and its associated vanes 67, 68 and 69 thus rotates as a unit with respect to the sleeve lining 61 and functions as a vane pump.

A spindle 81 projects axially from the stub shaft 73 into a bore 82 of the planetary gear 44. A key 83 drivably connects the gear 44 with the spindle 81. In a like manner, planetary gears 46 and 47 are connected to the rotors positioned in the bores 58 and 59. Thus the rotational and revolving movement of the planetary gears 44, 46, and 47 is dependent on the pumping action of the rotor 62 and its associated vanes 67, 68 and 69.

The side plate 51 has an integral annular flange 84 projected laterally toward the end wall 22 and positioned in a contiguous relationship therewith. The flange 84 is semicircular in cross section and has a diameter which is greater than the diameter of the plate 51. The annular flange 84 is open in an inward direction and defines an annular channel 86 for carrying liquid. A troughlike member 87 is secured to the end wall 22 by a nut and bolt assembly 88 and is maintained in alignment with the input shaft 18 by a pin 89 projecting from the end wall 22. The troughlike member 87 has an input end section 91 projected into the upper portion of the annular channel 86. From the input end section 91 the troughlike member 87 extends downwardly to an arcuate discharge end section 92 positioned adjacent an annular cup-shaped member 93. As shown in FIG. 3, the cup-shaped member 93 has the shape of a ring and is positioned concentrically about the shaft 18 in engagement with a plate 94. Bolts 96 secure the cup-shaped member 93 and plate 94 to the side of the plate 51. The cup-shaped member 93 opens in an inward direction and forms with the plate 94 an annular channel 97 for carrying hydraulic fluid discharged by the troughlike member 87.

As seen in FIG. 6, the plate 94 has three circumferentially spaced inlet holes 98, 99 and 101 which are in alignment with holes 102, 103 and 104 in the plate 51. The cylindrical body 52 has three axially extended inlet grooves 106, 107 and 108 in alignment with the holes 102, 103 and 104. Each of the sleeve liners 61 has a plurality of elongated openings 109 in registration with the grooves 106, 107 and 108 to provide fluid passages into the bores 57, 58 and 59. The openings 109 are positioned in a side-by-side relation over the length of the sleeve lining 61.

Figure 8:
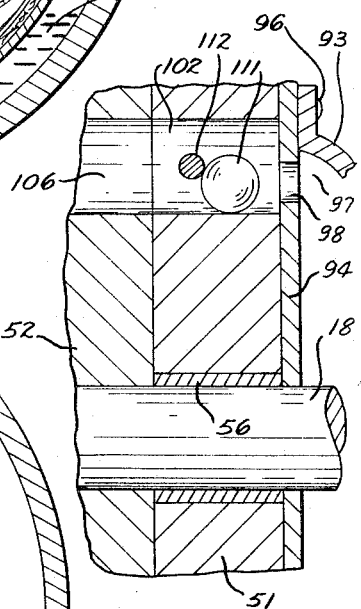
FIG. 8 is an enlargement fragmentary sectional view taken along the line 8—8 of FIG. 6.

As shown in FIG. 8, the hole 102 is larger in diameter than the hole 98 and has positioned therein a ball 111. A pin 112 extended diametrically across the hole 102 holds the ball 111 in the hole 102 adjacent the plate 94. The ball 111 functions as a one-way check valve allowing the free flow of fluid into the inlet groove 106 while blocking the reverse flow of fluid therefrom. Similar balls are positioned in holes 103 and 104 to function as check valves for regulating the flow of hydraulic fluid from the grooves 107 and 108.

As shown in FIG. 5, the cylindrical body 52 has three axially extended outlet grooves 113, 114 and 116 open to the bores 57, 58 and 59, respectively. The grooves 113, 114 and 116 extend the entire length of the body 52. Each sleeve 61 has a plurality of elongated openings 115 in registration with the respective grooves 113, 114 and 116 to provide fluid passages into the bores 57, 58 and 59.

From the grooves 113, 114 and 116 the hydraulic fluid flows through radial passages 117, 118 and 119 to the chamber 25 defined by the housing 21. Identical speed responsive valves 121, 122 and 123 are positioned in the peripheral portions of the passages 117, 118 and 119, respectively. The valves 121, 122 and 123 are normally open and are closed by the centrifugal force in response to rotation of the body 52.

Referring to FIG. 9, there is shown in detail the speed responsive valve 122. The radial passage 118 has a peripheral section 124 of an enlarged diameter for accommodating the valve 122. Positioned in the peripheral section 124 is a valve member 125 having a tapered peripheral surface. A stem 126 secured to the valve member 125 projects radially inwardly and terminates in three lateral arms 127 (FIG. 10). A washer 128 having a central opening 129 is threaded into the body 52 in axial alignment with the valve member 125. The tapered peripheral wall of the valve member 125 is engageable with the annular portion of the washer 128 defining the center opening 129 to check the flow of fluid out of the passage 118. The valve member 125 is biased to an open position by a spring 131 positioned in engagement with the arms 127 and the washer 128.

Referring to FIG. 6, the side plate 51 has three holes 132, 133 and 134 in alignment with the outlet grooves 113, 114 and 116, respectively. The plate 94 in a like manner has holes 136, 137 and 138 which are in registration with the holes 132, 133 and 134 in the plate 51. As shown in FIG. 9, the hole 137 is smaller than the hole 133. A ball 139 is positioned in the hole 133 and retained therein by a pin 141. The ball 139 is larger than the hole 137 and functions as a check valve to block the flow of fluid from the groove 114 into the annular channel 97 formed by the cup-shaped member 93.

To reverse the direction of rotation of the output shaft 19 the planetary gears 44, 46 and 47 must rotate about their respective axes without revolving around the sun gear 41. This is accomplished by a friction brake indicated generally at 142 (FIG. 5) which is operative to prevent rotation of the cylinder body 52 and attached side plates 49 and 51.

As shown in FIG. 5, the friction brake 142 comprises a circular band 143 positioned about the cylindrical body 52. A brake lining 144 is attached to the inner surface of the band 143. Secured to the adjacent ends of the brake band 143 are upright tapered ears 146 and 147. Tapered cams 148 and 149 engage the opposite sides of the ears 146 and 147, respectively, and are rotatable to clamp the brake band about the cylindrical body 52. A spring 151 is interposed between the ears 146 and 147 and functions to force the ears apart to release the brake band from the cylindrical body 52.

An actuator shaft 152 projects through a bore 154 in the housing 24 and is secured to the cams 148 and 149 such that upon rotation of the shaft the cams are rotated to actuate the brake. A handle 153 integral with the outer end of the shaft 152 is used as a crank to rotate the same. The linear position of the shaft with respect to the housing is maintained by a pair of collars 156 and 157 secured to the shaft and positioned in bearing engagement with the inside and outside portions of the housing 24.

In the operation of the fluid coupling 17 for driving the output shaft 19 in the same direction as the input shaft 18, as shown by the arrow 158 in FIG. 3, the sun gear 41 rotates the planetary gears 44, 46 and 47 which in turn drive the cylindrical rotors 62 positioned in the bores 57, 58 and 59. The driving action of the sun gear 41 on the planetary gears 44, 46 and 47 produces a torque which rotates the control assembly 48 about the input shaft 18. Thus the planetary gears 44, 46 and 47 function as key members forming a drive connection between the sun gear 41 and the internal ring gear 42 to rotate the output shaft 19 in the same direction as the input shaft 18. The speed of rotation of the output shaft is dependent upon the speed of rotation of the planetary gears 44, 46 and 47.

The control assembly 48 functions to control the speed of rotation of the planetary gears 44, 46 and 47 in accordance with the speed of rotation of the cylindrical body 52 to produce a high torque output at low speed and a low torque output at high speed.

On rotation of the cylindrical body 52 hydraulic liquid 26 is carried by the annular flange 84 into the input end section 91 of the troughlike member 87. The hydraulic fluid flows along the troughlike member 87 and is directed into the annular channel 97 by the discharge end section 92. From the channel 97 the hydraulic fluid flows through the inlet holes 98, 99 and 101 in the plate 94 and the corresponding inlet holes 102, 103 and 104 in the side plate 51 into the axial inlet grooves 106, 107 and 108 in the cylindrical body 52. The cylindrical rotor 62 and its associated vanes 67, 68 and 69 in each of the bores 57, 58 and 59 are rotated in the direction of the arrow 159 (FIG. 5) by the coaction of the planetary gears 44, 46 and 47 with the sun gear 41. The moving vanes 67, 68 and 69 function as a pump to withdraw the hydraulic fluid from the grooves 106, 107 and 108 and discharge fluid under pressure into the outlet grooves 113, 114 and 116.

As the cylindrical rotor 62 rotates about its axis the vanes 67, 68 and 69 reciprocate in a radial direction to maintain a sealing relation with the sleeve liner 61. Hydraulic fluid from the forward side of the vanes flows through the passages 71 into the base of the grooves 63, 64 and 66 to force the vanes in a radially outward direction into engagement with the inner wall of the sleeve liner 61.

From the outlet grooves 113, 114 and 116 the hydraulic fluid flows into the radial passages 117, 118 and 119 and through the speed responsive valves 121, 122 and 123 positioned in each of the passages into the bottom section of the housing 21. As the speed of the cylindrical body 52 increases the valve member 125 of each of the speed responsive valves moves under the action of centrifugal force to a closed position with respect to the washer 128 thus terminating the flow of hydraulic fluid in each of the radial passages 117, 118 and 119.

The cylindrical rotors 62 continue to rotate until the hydraulic pressure on the discharge side is equal to the torque applied to the planetary gears 44, 46 and 47 by the sun gear 41. Under these conditions the planetary gears 44, 46 and 47 function as drive links providing a direct drive between the sun gear 41 and the internal ring gear 42 with the result that the input shaft 18 and output shaft 19 are coupled in a one-to-one drive relation.

When the speed of rotation of the cylindrical body 52 falls below a predetermined level the spring 131 will move the valve member 125 in each of the speed responsive valves 121, 122 and 123 to an open position thereby permitting the flow of hydraulic fluid from the discharge passages 117, 118 and 119 into the bottom section of the housing 21. This releases the pressure on the discharge side of the vane-type pump and permits the rotation of the cylindrical rotors 62 and the associated planetary gears 44, 46 and 47 about their respective axes thereby changing the drive ratio between the input shaft 18 and the output shaft 19.

The direction of rotation of the output shaft 19 is reversed by actuating the friction brake 142. As shown in FIG. 5, the friction brake 142 is actuated by rotating the handle 153 which in turn rotates the cams 148 and 149 to contract the brake band 143 about the cylindrical body 52. With the cylindrical body 52 held in a fixed position the planetary gears 44, 46 and 47 merely rotate about their respective axes and transmit power from the sun gear 41 to the internal ring gear 42. The planetary gears 44, 46 and 47 thus function to reverse the direction of rotation of the ring gear 42 and the associated output shaft 19. Since the cylindrical body 52 and its associated end plates 49 and 51 do not rotate when the brake 142 is actuated the hydraulic fluid 26 remains in the bottom of the housing 21 with the result that the pumping action of the cylindrical rotors 62 and associated vanes is nominal. When the brake 142 is released the body 52 will rotate and drive the planetary gears 44, 46 and 47 about the axis of the shaft 18, thus changing the direction of rotation of the output shaft 19.

When power is transmitted from the output shaft 19 to the input shaft 18 the control assembly 48 is operative to prevent rotation of the planetary gears 44, 46 and 47 thereby effecting a positive drive between the output shaft 19 and the input shaft 18. The cylindrical rotors 62 and their associated vanes are driven by the ring gear 42 in the opposite direction so as to discharge hydraulic fluid into the grooves 106, 107 and 108.

As shown in FIG. 8, the ball 111 functions as a check valve preventing the flow of fluid from the grooves 106. Similar balls carried by the plate 51 prevent the flow of fluid from the grooves 107 and 108. The rotating cylindrical rotors 62 and their associated vanes draw fluid through the grooves 113, 114 and 116 which are connected to a fluid supply in the annular channel 97 by holes 132, 133 and 134 in the side plate 51. Each hole has a ball check valve 139 as shown in FIG. 9, which permits the flow of fluid from the annular channel 97 into the grooves 113, 114 and 116. The pressure of the hydraulic fluid developed by the rotating cylindrical rotors 62 and their associated vanes will build up in the grooves 106, 107 and 108 and eventually stop rotational movement of the cylindrical rotors 62 thereby preventing rotation of the planetary gears 44, 46 and 47 to effect a positive drive connection between the ring gear 42 and the sun gear 41. Thus, the prime mover 15 functions as a brake to absorb torque transmitted to the input shaft 18 from the output shaft 19 by the fluid coupling 17.

In summary, the fluid coupling 17 of this invention is a speed responsive device which functions to have a high torque output at low speeds and a low torque output at high speeds. This is accomplished by the use of a planetary gear train 39 having planetary gears operatively connected to a control assembly 48 for regulating the rotational movement and revolving movement of the planetary gears about the sun gear of the planetary gear train.

The control assembly has a plurality of vane-type pumps which are connected in a fluid relation to speed responsive outlet valves which control the flow of fluid discharged from the pumps. As the speed of the control assembly is increased the outlet valves close with the result that the vane-type pumps are stalled, thereby preventing rotation of the planetary gears. With the planetary gears held against rotation about their respective axes the sun gear is drivably locked to the ring gear thereby providing a direct drive between the input shaft and the output shaft of the fluid coupling.

While there have been shown, described, and pointed out the fundamental novel features of the invention, it will be understood that various omissions, substitutions, changes in form, and details of the fluid coupling illustrated may be made by those skilled in the art without departing from the spirit of the invention which is intended to be limited only as indicated by the scope of the following claims.

I claim:

1. A fluid coupling comprising:
 (a) a housing defining a chamber for storing a supply of hydraulic fluid,
 (b) first shaft means and second shaft means projected into the chamber and rotatably mounted on said housing,
 (c) planetary gear train means drivably coupling the first shaft means with the second shaft means including a sun gear secured to the first shaft means, a ring gear extended about the sun gear and secured to the second shaft means, and at least one planetary gear positioned between the sun gear and ring gear in meshed engagement therewith,
 (d) control means for regulating the speed of rotation of the planetary gear, including a body means rotatably mounted on said first shaft means adjacent the gear train means, said body means having at least one axially extended bore, a rotary pump means operably positioned in said bore and connected to said planetary gear for rotation therewith, said pump means having an inlet and an outlet, a first passage means in said body means open to said outlet and to said chamber, a second passage means in said body means to said inlet and to one end of said body means, (e) valve means in said first passage means for regulating the flow of fluid discharged from said outlet, said valve means being movable to a closed position in response to a selected speed of rotation of the control means whereby to terminate the flow of fluid from the outlet of said pump means and prevent the rotation thereof to stop the rotation of the planetary gears and effect a substantially one-to-one drive ratio between the input shaft and output shaft, (f) means for supplying fluid from said chamber to said second passage means including a first annular channel member, for collecting and carrying the hydraulic fluid stored in the housing, secured to said one end of the body means in a coaxial relation therewith, (g) a second annular channel member secured to said one end of the body means in an inwardly spaced concentric relation with said first annular channel member, and (h) troughlike means having an inlet section extended into said first channel member for receiving the fluid carried therein and an outlet section for discharging the received hydraulic fluid into said second channel member for admission to said second passage means.

2. The fluid coupling defined in claim 1 including:

(a) a third passage means in said body means having one end open to said first passage means at a position between said valve means and the outlet of said pump means and an opposite end open to said one end of said body means within the peripheral confines of said second annular channel member, and (b) a check valve means in said third passage means for by-passing fluid from said first passage means into said second annular channel member prior to the closing of said valve means.

References Cited by the Examiner

UNITED STATES PATENTS

| | | | |
|---|---|---|---|
| 1,755,182 | 4/1930 | Kline | 74—774 |
| 1,954,418 | 4/1934 | Ley | 74—774 |
| 2,019,849 | 11/1935 | Foster | 74—774 |
| 2,079,691 | 4/1937 | Joyce | 74—774 |
| 2,218,896 | 10/1940 | Shultz | 74—774 |
| 2,267,131 | 12/1941 | Paulsen | 74—774 |
| 2,471,031 | 4/1949 | Gleasman | 74—774 |

FOREIGN PATENTS 884,000   7/1943   France.

DAVID J. WILLIAMOWSKY, *Primary Examiner.*

J. R. BENEFIEL, *Assistant Examiner.*